(12) United States Patent
Matsui et al.

(10) Patent No.: US 9,114,472 B2
(45) Date of Patent: Aug. 25, 2015

(54) ARC WELDING CONTROL METHOD AND ARC WELDING APPARATUS

(75) Inventors: Kaito Matsui, Osaka (JP); Atsuhiro Kawamoto, Hyogo (JP); Yukinori Hirota, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 253 days.

(21) Appl. No.: 13/643,316

(22) PCT Filed: May 10, 2012

(86) PCT No.: PCT/JP2012/003051
§ 371 (c)(1),
(2), (4) Date: Oct. 25, 2012

(87) PCT Pub. No.: WO2012/164833
PCT Pub. Date: Dec. 6, 2012

(65) Prior Publication Data
US 2013/0068744 A1 Mar. 21, 2013

(30) Foreign Application Priority Data
Jun. 3, 2011 (JP) .................................. 2011-124816

(51) Int. Cl.
*B23K 9/095* (2006.01)
*B23K 9/09* (2006.01)
*B23K 9/173* (2006.01)

(52) U.S. Cl.
CPC .............. *B23K 9/092* (2013.01); *B23K 9/0953* (2013.01); *B23K 9/173* (2013.01)

(58) Field of Classification Search
USPC ............... 219/125.1, 130.01, 130.21, 130.33, 219/137 R, 137.7, 137.71
See application file for complete search history.

(56) References Cited

U.S. PATENT DOCUMENTS

2006/0102695 A1  5/2006  Era et al.
2007/0246448 A1  10/2007  Nishisaka et al.
(Continued)

FOREIGN PATENT DOCUMENTS

CN  101058124 A  10/2007
CN  101524781 A  9/2009
(Continued)

OTHER PUBLICATIONS

Japanese International Search Report for Application No. PCT/JP2012/003051, dated Jul. 31, 2012, 2 pgs.
(Continued)

*Primary Examiner* — Brian Jennison
(74) *Attorney, Agent, or Firm* — RatnerPrestia

(57) ABSTRACT

In an arc welding control method of repeating a short circuit and an arc to perform welding, control is carried out to conduct a welding current having a first polarity for a short circuit period, and a first commutation to commutate the welding current from the first polarity to be a polarity of the welding current for the short circuit period to a second polarity to be opposite to the first polarity is carried out for an arc period subsequent to the short circuit period. Furthermore, control is performed to carry out a second commutation to commutate the welding current from the second polarity to the first polarity for the arc period in which the first commutation is executed. Consequently, it is possible to reduce an energy input amount to a base metal, thereby suppressing burn-through in welding of a thin plate.

20 Claims, 4 Drawing Sheets

(56) References Cited

U.S. PATENT DOCUMENTS

| | | |
|---|---|---|
| 2008/0156781 A1* | 7/2008 | Artelsmair et al. ........ 219/130.5 |
| 2012/0074114 A1* | 3/2012 | Kawamoto et al. ...... 219/130.21 |
| 2013/0082040 A1 | 4/2013 | Kawamoto et al. |
| 2013/0082041 A1 | 4/2013 | Kawamoto et al. |

FOREIGN PATENT DOCUMENTS

| | | |
|---|---|---|
| CN | 20128001460.5 | 4/2014 |
| DE | 102006050297 | 4/2008 |
| DE | 102008017172 | 10/2008 |
| EP | 2292364 A1 | 3/2011 |
| JP | 62-006775 A | 1/1987 |
| JP | 63-157765 A | 6/1988 |
| JP | 63-281774 A | 11/1988 |
| JP | 6-079457 | 3/1994 |
| JP | 11-156541 A | 6/1999 |
| JP | 2005-254274 | 9/2005 |
| JP | 2006-142317 A | 6/2006 |
| JP | 2010-142824 A | 7/2010 |
| WO | WO 2010/146844 A1 | 12/2010 |

OTHER PUBLICATIONS

The Extended European Search Report dated Mar. 17, 2015 for the related European Patent Application No. 12759339.0.

* cited by examiner

ARC WELDING CONTROL METHOD AND ARC WELDING APPARATUS

This Application is a U.S. National Phase Application of PCT International Application PCT/JP2012/003051.

TECHNICAL FIELD

The present invention relates to an arc welding control method of a consumable electrode type and an arc welding apparatus of a consumable electrode type which alternately generate a short circuit state and an arc state to carry out welding while feeding a welding wire to be a consumable electrode.

BACKGROUND ART

In recent years, in the welding industry, it is greatly demanded to increase a welding speed or to reduce sputtering in order to enhance productivity. In order to meet these demands, an arc welding apparatus of a consumable electrode type is developed and an arc welding control method is devised. However, there is not devised an arc welding control method of reducing an energy input of welding so as not to cause burn-through or the like due to welding of a thin plate.

FIG. 4 is a chart showing an output waveform in a conventional arc welding control method accompanied by a short circuit, illustrating a time variation in a wire feeding speed Wf and a welding current Aw. Referring to an arc welding control method of alternately generating a short circuit state and an arc state to carry out welding while feeding a welding wire to be a consumable electrode, a wire feeding motor is controlled to cause the wire feeding speed Wf to cyclically repeat forward feeding and backward feeding. It is known that control is carried out to reduce a welding output for a period having a small wire feeding amount and to increase the welding output for a period having a large wire feeding amount with the control of the wire feeding motor as shown in FIG. 4 (for example, see Patent Literature 1).

Referring to the wire feeding speed Wf, moreover, each of the forward feeding and the backward feeding is carried out once in one cycle so that each of the generation of the short circuit and opening of the short circuit (the generation of an arc) is once performed correspondingly. Thus, the welding control is accompanied by an arc phenomenon depending on the cyclic operation of the wire feeding speed. An inverse number of a cycle of a preset wire feeding speed serves as a short circuit frequency so that stable welding having a certain short circuit frequency can be carried out.

Referring to the conventional arc welding control method, for example, stable welding can be carried out without burn-through in the case in which a plate having a thickness of 0.8 mm or more is to be welded. However, in the case in which a thin plate having a thickness of 0.6 mm or less is to be welded, for example, an energy input amount to a base metal is large so that the burn-through occurs. For this reason, there is a problem in that satisfactory welding cannot be carried out.

CITATION LIST

Patent Literature

PTL 1 Unexamined Japanese Patent Publication No. S62-6775

SUMMARY OF THE INVENTION

It is an object of the present invention to provide an arc welding control method and an arc welding apparatus which can decrease an energy input amount to a base metal and can also carry out welding over a thin plate having a thickness of 0.6 mm or less without causing burn-through, for example.

In order to achieve the object, the present invention provides an arc welding control method of repeating a short circuit and an arc to perform welding in which a welding current is controlled to conduct a welding current having a first polarity for a short circuit period. A first commutation to commutate the welding current from the first polarity to be a polarity of the welding current for the short circuit period to a second polarity to be opposite to the first polarity is carried out for an arc period subsequent to the short circuit period. Furthermore, the welding current is controlled to carry out a second commutation to commutate the welding current from the second polarity to the first polarity for the arc period in which the first commutation is executed.

By the method, an energy input amount to a base metal is reduced. Consequently, it is possible to weld a thin plate having a thickness of 0.6 mm or less without causing burn-through, for example, which is hard to perform by a conventional arc welding control method.

Moreover, the present invention provides an arc welding apparatus to repeat a short circuit and an arc to perform welding between a welding wire and a welding target, includes a primary side rectifying unit, a switching unit, a transformer, a secondary side rectifying unit, a polarity change-over unit, a welding voltage detecting unit, a short-circuit arc deciding unit and a polarity inversion setting unit. The primary side rectifying unit rectifies an input AC power. The switching unit sets an output of the primary side rectifying unit into an alternating current. The transformer transforms an output of the switching unit. The secondary side rectifying unit rectifies an output of the transformer. The polarity change-over unit changes over an output of the secondary side rectifying unit into an output having a first polarity or a secondary polarity to be opposite to the first polarity. The welding voltage detecting unit detects a welding output voltage. The short-circuit arc deciding unit decides a short circuit period or an arc period based on a result of the detection obtained by the welding voltage detecting unit. The polarity inversion setting unit outputs a polarity inversion control signal to the polarity change-over unit based on a result of the decision obtained by the short-circuit arc deciding unit. In the arc welding apparatus according to the present invention, the polarity inversion setting unit outputs a polarity inversion control signal to the polarity change-over unit to conduct a welding current having the first polarity, thereby outputting the welding current having the first polarity for the short circuit period. In the arc welding apparatus according to the present invention, the polarity inversion setting unit outputs a polarity inversion control signal to the polarity change-over unit to carry out a first commutation to commutate a welding current from the first polarity to be a polarity of the welding current for the short circuit period to a second polarity to be opposite to the first polarity, thereby outputting the welding current having the second polarity for an arc period subsequent to the short circuit period. In the arc welding apparatus according to the present invention, the polarity inversion setting unit outputs a polarity inversion control signal to the polarity change-over unit to carry out a second commutation to commutate the welding current from the second polarity to the first polarity, thereby outputting the welding current having the first polarity for the arc period in which the first commutation is executed.

By the structure, an energy input amount to a base metal is reduced. Consequently, it is possible to weld a thin plate having a thickness of 0.6 mm or less without causing burn-through, for example, which is hard to perform by a conventional arc welding apparatus.

DESCRIPTION OF EMBODIMENTS

Figure 1:
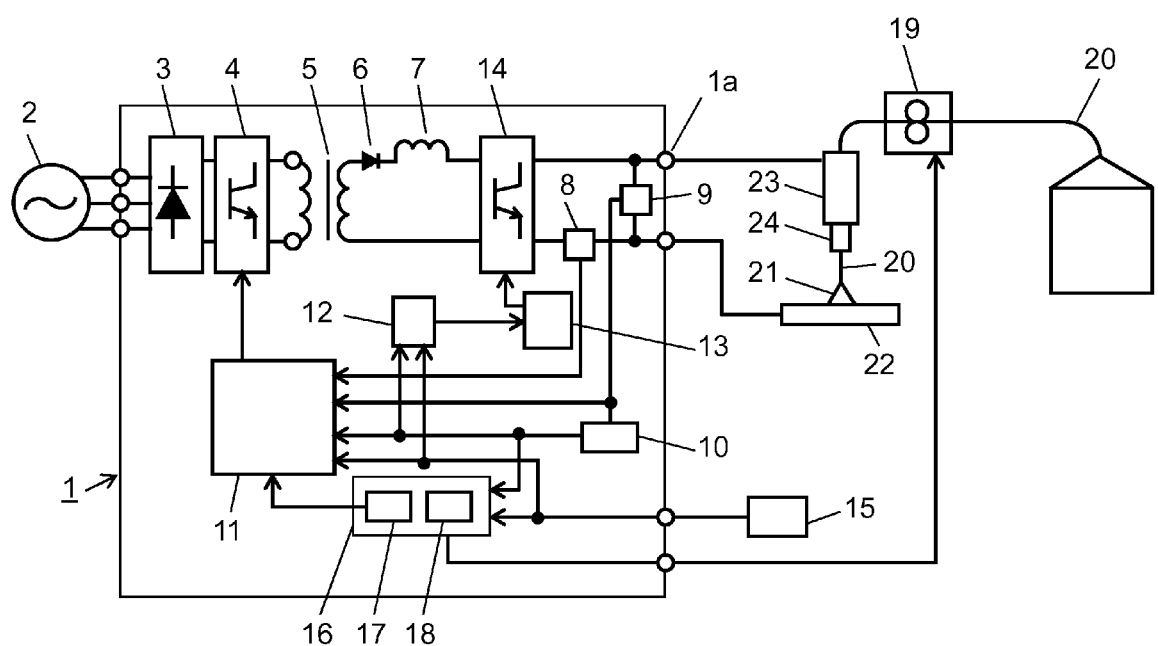
FIG. 1 is a diagram showing a schematic structure of an arc welding apparatus according to first to fourth exemplary embodiments of the present invention.

An exemplary embodiment according to the present invention will be described below with reference to the drawings. In the following drawings, the same components have the same reference numerals, and therefore, description will be omitted in some cases.
(First Exemplary Embodiment)

Figure 2:
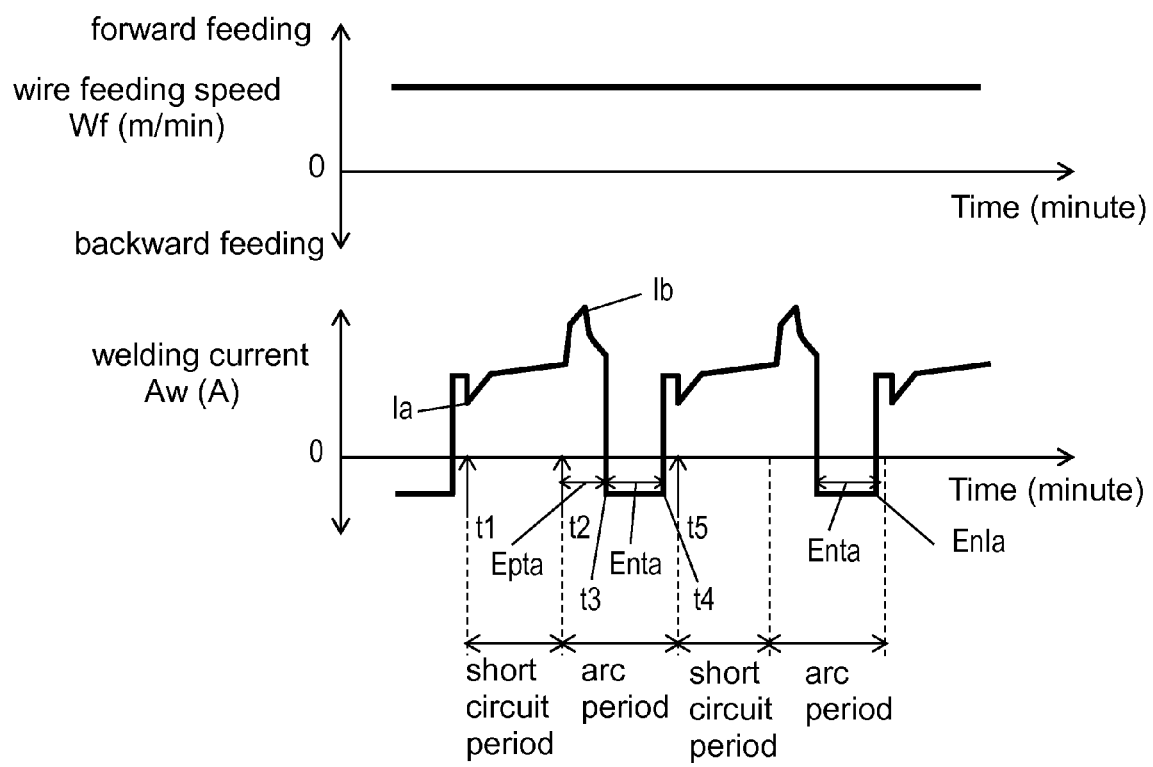
FIG. 2 is a chart showing an output waveform of an arc welding control method according to the first and second exemplary embodiments of the present invention.

FIG. 1 is a diagram showing a schematic structure of arc welding apparatus 1 of a consumable electrode type according to a first exemplary embodiment of the present invention. FIG. 2 is a chart showing temporal waveforms of a wire feeding speed and a welding current in the case in which welding is carried out by the arc welding control method of a consumable electrode type according to the first exemplary embodiment of the present invention.

As shown in FIG. 1, arc welding apparatus 1 includes primary side rectifying unit 3, switching unit 4, main transformer 5, secondary side rectifying unit 6, rector 7, welding current detecting unit 8, welding voltage detecting unit 9, short circuit/arc detecting unit 10, output control unit 11, polarity inversion setting unit 12, polarity inversion output control unit 13, polarity inversion switching unit 14, and wire feeding speed control unit 16. Primary side rectifying unit 3 rectifies an input voltage (an input AC power) which is input from input power supply 2 provided on an outside of arc welding apparatus 1. Switching unit 4 controls an output of primary side rectifying unit 3 into a suitable output for welding (an alternating current). Main transformer 5 insulates and converts (transforms) an output of switching unit 4 into a suitable output for the welding. Secondary side rectifying unit 6 rectifies an output of main transformer 5. Reactor 7 smoothens an output of secondary side rectifying unit 6 into a suitable current for the welding. Welding current detecting unit 8 detects a welding current. Welding voltage detecting unit 9 detects a welding voltage. Short circuit/arc detecting unit 10 decides whether a welding state is a short circuit state in which wire 20 and base metal 22 are short-circuited in contact or an arc state in which a short circuit is opened to generate arc 21 in response to a welding voltage detecting signal to be an output of welding voltage detecting unit 9. Accordingly, a short-circuit arc deciding unit includes short circuit/arc detecting unit 10 and decides a short circuit period or an arc period based on a result of detection obtained by welding voltage detecting unit 9. Output control unit 11 outputs a control signal to switching unit 4, thereby controlling a welding output. Polarity inversion setting unit 12 outputs a time signal (a polarity inversion control signal) for determining a timing to invert a polarity of the welding output to a polarity change-over unit based on a result of the decision obtained by the short-circuit arc deciding unit. Polarity inversion output control unit 13 carries out control to invert the polarity of the welding output based on a signal sent from polarity inversion setting unit 12. Polarity inversion switching unit 14 (the polarity change-over unit) inverts the polarity of the welding output which is output from reactor 7 based on a signal sent from polarity inversion output control unit 13. Moreover, the polarity change-over unit changes over the output of secondary side rectifying unit 6 into an output having a second polarity which is opposite to a first polarity. Wire feeding speed control unit 16 controls a feeding speed of wire 20 fed by wire feeding unit 19.

Moreover, wire feeding speed control unit 16 includes storage unit 17 and wire feeding speed determining unit 18. Storage unit 17 stores an expression or a table which causes a welding set current, an average feeding speed of a wire feeding speed, a frequency of the wire feeding speed and an amplitude of the wire feeding speed to correspond to each other. Wire feeding speed determining unit 18 determines the average feeding speed of the wire feeding speed, the frequency of the wire feeding speed and the amplitude of the wire feeding speed from the expression or the table in storage unit 17 based on a welding set current which is set by welding condition setting unit 15 connected to arc welding apparatus 1 for setting a welding condition.

Welding condition setting unit 15 connected to arc welding apparatus 1 has a function for setting the welding condition such as a welding set current or a welding set voltage, and furthermore, has a function for adjusting first predetermined time Epta and second predetermined time Enta which will be described below.

As shown in FIG. 1, moreover, wire feeding unit 19 serves to feed wire 20 based on a control signal sent from wire feeding speed control unit 16 of arc welding apparatus 1. Torch 23 is provided with tip 24 for feeding a power to wire 20. One of terminals of the welding output of arc welding apparatus 1 is electrically connected to wire 20 and the other terminal of the welding output is electrically connected to base metal 22. The welding output is given between wire 20 and base metal 22 so that arc 21 is generated between wire 20 and base metal 22 and welding is thus carried out.

The operation of arc welding apparatus 1 of a consumable electrode type which has the structure described above will be described with reference to FIG. 2. FIG. 2 shows, in a waveform, a time variation in wire feeding speed Wf and welding current Aw to be a welding output current.

In FIG. 2, for a short circuit period from time t1 to time t2, welding current Aw is first reduced to be current Ia by current control in order to reliably generate a short circuit at time t1 to be an initial time of the generation of the short circuit. Then, welding current Aw is raised in a predetermined inclination by the current control. On the other hand, wire feeding speed Wf is always constant irrespective of a time to continuously carry out feeding. Thereafter, the short circuit is opened at time t2 so that an arc is generated to bring an arc period. The welding current to be conducted for the short circuit period is set to be a welding current having a first polarity flowing from wire 20 toward base metal 22.

For an arc period from time t2 to time t5, current control is carried out to raise the welding current in a predetermined inclination from time t2 in an initial stage of the generation of the arc. The rise is performed until the welding current reaches current Ib. At time t3 that first predetermined time Epta passes since time t2 in the initial stage of the generation of the arc, then, there is carried out a first commutation in which the welding current is commutated into a second polarity to be opposite to a first polarity. After the first commutation is carried out, positive electrode current EnIa is caused to flow as the welding current having the second polarity from base metal 22 toward wire 20. At time t4 that second predetermined time Enta passes since time t3, furthermore, there is carried out a second commutation in which the welding current is commutated from the second polarity to the first polarity.

Positive electrode current EnIa output from time t3 to time t4 is the welding current having the second polarity in which wire 20 side is a negative electrode and base metal 22 side is a positive electrode. In the welding in which the welding current having the second polarity is output, fusion of wire 20 is promoted. Therefore, it is possible to reduce the energy input to base metal 22.

By varying a value of positive electrode current EnIa or second predetermined time Enta, it is possible to adjust a depth of weld penetration into base metal 22. For example, a current value of positive electrode current EnIa is set to be greater than a prestored value in polarity inversion setting unit 12 corresponding to the welding set current which is set by welding condition setting unit 15. In other words, an absolute value of the current value of positive electrode current EnIa is increased and a duration of second predetermined time Enta is set to be longer than a value which is prestored in polarity inversion setting unit 12 corresponding to the welding set current set by welding condition setting unit 15. Thus, it is possible to further promote the fusion of wire 20, thereby reducing the energy input to base metal 22 more greatly.

By reducing first predetermined time Epta to further prolong the duration of second predetermined time Enta, moreover, it is also possible to promote the fusion of wire 20 more greatly, thereby decreasing the energy input amount to base metal 22 effectively.

First predetermined time Epta, second predetermined time Enta and positive electrode current EnIa are caused to correspond to the welding set current. When the welding current is set, a corresponding value is determined. It is preferable that the values of first predetermined time Epta, second predetermined time Enta and positive electrode current EnIa should be suitable for a welding target obtained by an experiment or the like. It is preferable that these values should be stored as a table or a numerical expression in polarity inversion setting unit 12 corresponding to the welding set current value which is set by welding condition setting unit 15.

The arc welding control method of a consumable electrode type according to the first exemplary embodiment serves to repeat control for the short circuit period and the arc period. The operation of arc welding apparatus 1 to carry out the arc welding control of the consumable electrode type will be described with reference to FIG. 1.

As shown in FIG. 1, welding voltage detecting unit 9 is connected between output terminals 1a of arc welding apparatus 1 and outputs a corresponding signal to a detected voltage. Short circuit/arc detecting unit 10 decides whether a welding output voltage is equal to or higher than a certain value or is lower than the certain value based on a signal sent from welding voltage detecting unit 9. Based on a result of the decision, short circuit/arc detecting unit 10 decides whether wire 20 is set into a short circuit state (a short circuit period) in which it is short-circuited in contact with base metal 22 to be a welded object or an arc state (an arc period) in which they do not come in contact with each other but arc 21 is generated, and outputs a decision signal.

Next, description will be given to the control of the welding current to be output and the welding voltage to be output, that is, welding output control. A welding set current and a welding set voltage are set by welding condition setting unit 15 connected to arc welding apparatus 1. Based on the welding set current and the welding set voltage which are set, a welding waveform parameter is selected from the expression or table stored in storage unit 17. Based on the welding waveform parameter, output control unit 11 outputs, to switching unit 4, a signal to control the welding current or the welding voltage by using a proper parameter for the short circuit period if any. Moreover, output control unit 11 outputs, to switching unit 4, the signal to control the welding current or the welding voltage by using a proper parameter for the arc period if any.

Switching unit 4 inputs a signal output from output control unit 11, thereby controlling a welding output. Although the welding current having the first polarity is output for the short circuit period, the welding current having the first polarity and the welding current having the second polarity to be opposite to the first polarity are output for the arc period.

Next, description will be given to the output of the welding current for the arc period. There will be supposed the case in which short circuit/arc detecting unit 10 is decided to be set in the arc state based on a signal sent from welding voltage detecting unit 9. In this case, polarity inversion setting unit 12 having a timer function sets, as a time starting point, a time point in which arc 21 is generated, and outputs, to polarity inversion output control unit 13, a continuation signal for continuously holding the first polarity until first predetermined time Epta passes. When detecting that first predetermined time Epta passes, polarity inversion setting unit 12 outputs, to polarity inversion output control unit 13, a polarity inverting signal for inverting the polarity into the second polarity. Polarity inversion output control unit 13 inputting the signal from polarity inversion setting unit 12 outputs a polarity inversion control signal to polarity inversion switching unit 14 and polarity inversion switching unit 14 executes the first commutation. Then, polarity inversion setting unit 12 outputs, to polarity inversion output control unit 13, a continuation signal for continuously holding the second polarity till time t4 that second predetermined time Enta passes with time t3 for the execution of the first commutation set to be a time starting point. When time t4 that second predetermined time Enta passes is reached, then, polarity inversion setting unit 12 outputs, to polarity inversion output control unit 13, a polarity inverting signal for inverting the polarity to the first polarity. Polarity inversion output control unit 13 inputting a signal from polarity inversion setting unit 12 outputs the polarity inversion control signal to polarity inversion switching unit 14 and polarity inversion switching unit 14 executes the second commutation.

Referring to the values of first predetermined time Epta, second predetermined time Enta and positive electrode current EnIa, proper values corresponding to the welding set current value set by welding condition setting unit 15 are stored in polarity inversion setting unit 12. When the welding set current value is set by welding condition setting unit 15, the values of first predetermined time Epta, second predetermined time Enta and positive electrode current EnIa are determined in polarity inversion setting unit 12.

As described above, according to the first exemplary embodiment, the welding current for the arc period is commutated from the first polarity into the second polarity to set wire 20 side into a negative electrode. As compared with conventional DC welding in which wire 20 side and base metal 22 side are always the positive electrode and the negative electrode respectively, consequently, it is possible to promote the fusion of wire 20, thereby reducing the energy input amount to base metal 22. Thus, it is possible to easily take a countermeasure against welding of a thin plate, a gap between base metals 22 or the like on a welding spot without causing burn-through or the like. By regulating the value of positive electrode current EnIa, furthermore, it is possible to obtain proper weld penetration of base metal 22.

Referring to the regulation of positive electrode current EnIa, welding condition setting unit 15 has a function for adjusting positive electrode current EnIa and an operator can regulate positive electrode current EnIa. More specifically, welding condition setting unit 15 is provided with a current regulation amount setting unit (not shown) for changing or regulating the value of positive electrode current EnIa determined by polarity inversion setting unit 12 based on the welding set current which is set by welding condition setting unit 15. It is preferable to carry out the regulation by the current regulation amount setting unit.

In other words, the arc welding control method according to the first exemplary embodiment serves to carry out the welding by repeating the short circuit and the arc, and controls the welding current to conduct the welding current having the first polarity for the short circuit period. The arc welding control method according to the first exemplary embodiment is constituted by a method of controlling the welding current in order to carry out the first commutation to commutate the welding current from the first polarity to be the polarity of the welding current for the short period to the second polarity to be opposite to the first polarity for the arc period subsequent to the short circuit period and the second commutation to commutate the welding current from the second polarity to the first polarity for the arc period in which the first commutation is performed.

By the method, the energy input amount to the base metal is reduced. Consequently, it is possible to weld a thin plate having a thickness of 0.6 mm or less without causing burn-through, for example, which is hard to perform by the conventional arc welding control method.

Moreover, it is also possible to employ a method of carrying out the first commutation after the first predetermined time passes since the start of the arc period.

By the method, the energy input amount to the base metal is reduced. Consequently, it is possible to weld a thin plate having a thickness of 0.6 mm or less without causing burn-through, for example, which is hard to perform by the conventional arc welding control method.

Furthermore, it is also possible to employ a method of carrying out the second commutation after the second predetermined time passes since the execution of the first commutation.

By the method, the energy input amount to the base metal is reduced. Consequently, it is possible to weld a thin plate having a thickness of 0.6 mm or less without causing burn-through, for example, which is hard to perform by the conventional arc welding control method.

In addition, the arc welding apparatus according to the first exemplary embodiment repeats a short circuit and an arc to perform welding between a welding wire and a welding target, and includes a primary side rectifying unit, a switching unit, a transformer, a secondary side rectifying unit, a polarity change-over unit, a welding voltage detecting unit, a short-circuit arc deciding unit and a polarity inversion setting unit. In the arc welding apparatus according to the first exemplary embodiment, the polarity inversion setting unit outputs the polarity inversion control signal to the polarity change-over unit to conduct the welding current having the first polarity, thereby outputting the welding current having the first polarity for the short circuit period. In the arc welding apparatus according to the first exemplary embodiment, the polarity inversion setting unit outputs the polarity inversion control signal to the polarity change-over unit to carry out the first commutation to commutate the welding current from the first polarity to be the polarity of the welding current for the short circuit period to the second polarity to be opposite to the first polarity, thereby outputting the welding current having the second polarity for the arc period subsequent to the short circuit period. In the arc welding apparatus according to the first exemplary embodiment, the polarity inversion setting unit outputs the polarity inversion control signal to the polarity change-over unit to carry out the second commutation to commutate the welding current from the second polarity to the first polarity, thereby outputting the welding current having the first polarity for the arc period in which the first commutation is executed.

By the structure, the energy input amount to the base metal is reduced. Consequently, it is possible to weld a thin plate having a thickness of 0.6 mm or less without causing burn-through, for example, which is hard to perform by the conventional arc welding apparatus.

Moreover, the polarity inversion setting unit may have such a structure as to time an elapsed time since the start of the arc period and to output the polarity inversion control signal to carry out the first commutation after the first predetermined time passes since the start of the arc period.

By the structure, the energy input amount to the base metal is reduced. Consequently, it is possible to weld a thin plate having a thickness of 0.6 mm or less without causing burn-through, for example, which is hard to perform by the conventional arc welding apparatus.

Furthermore, the polarity inversion setting unit may have such a structure as to time an elapsed time since the execution of the first commutation and to output the polarity inversion control signal to carry out the second commutation after the second predetermined time passes since the execution of the first commutation.

By the structure, the energy input amount to the base metal is reduced. Consequently, it is possible to weld a thin plate having a thickness of 0.6 mm or less without causing burn-through, for example, which is hard to perform by the conventional arc welding apparatus.

(Second Exemplary Embodiment)

A second exemplary embodiment according to the present invention is mainly different from the first exemplary embodiment in that an operator can adjust first predetermined time Epta and second predetermined time Enta which are times that the first commutation and the second commutation are to be carried out for the arc period, respectively.

An arc welding apparatus according to the second exemplary embodiment is constituted by the same components as those in arc welding apparatus 1 of a consumable electrode type shown in FIG. 1, and therefore, an operation thereof will be described with reference to FIG. 1. In the second exemplary embodiment, welding condition setting unit 15 shown in FIG. 1 has a function for adjusting first predetermined time Epta or second predetermined time Enta. Consequently, the operator can adjust first predetermined time Epta or the second predetermined time Enta. More specifically, welding condition setting unit 15 is provided with an adjusting amount setting unit (not shown) for changing or adjusting the value of first predetermined time Epta or second predetermined time Enta which is determined by polarity inversion setting unit 12 based on a welding set current set by welding condition setting unit 15.

First predetermined time Epta and second predetermined time Enta are prestored in polarity inversion setting unit 12 corresponding to a welding set current value set by welding condition setting unit 15. In polarity inversion setting unit 12, there are determined first predetermined time Epta and second predetermined time Enta corresponding to the welding set current value which is set by welding condition setting unit 15. In polarity inversion setting unit 12, however, first predetermined time Epta and second predetermined time Enta which are determined can be adjusted depending on an adjusting amount of first predetermined time Epta and that of second predetermined time Enta which are set by the adjusting amount setting unit of welding condition setting unit 15.

For example, there will be supposed the case in which an energy input amount to base metal 22 is to be decreased to reduce a weld penetration amount as compared with the case in which welding is carried out for first predetermined time Epta and second predetermined time Enta depending on the welding set current value which is set by welding condition setting unit 15. In this case, the operator carries out adjustment to shorten first predetermined time Epta and to prolong second predetermined time Enta by using welding condition setting unit 15. Consequently, it is possible to decrease the energy input amount to base metal 22, thereby reducing the weld penetration amount.

By enabling the adjustment of first predetermined time Epta or second predetermined time Enta which is determined based on the welding set current value, thus, it is possible to easily regulate the weld penetration amount of base metal 22 on a welding spot. Consequently, it is possible to widen application to a thin plate.

First predetermined time Epta and second predetermined time Enta which are stored in polarity inversion setting unit 12 are predetermined times and preferably have suitable values for a welding target based on experiment, actual proof or the like. For example, the first predetermined time is approximately 1 msec to 5 msec, and the second predetermined time is approximately 1 msec to 8 msec.

As described above, according to the second exemplary embodiment, the operator can easily adjust each of first predetermined time Epta and second predetermined time Enta. Consequently, it is possible to change the energy input amount and the weld penetration amount to base metal 22, resulting in reduction in the energy input amount to base metal 22. Thus, it is possible to easily take a countermeasure against the welding of a thin plate, a gap between base metals 22 or the like on a welding spot without causing burn-through or the like.

(Third Exemplary mbodiment)

A third exemplary embodiment according to the present invention is mainly different from the first exemplary embodiment in that forward feed and backward feed are cyclically repeated in a predetermine cycle and a predetermined amplitude as the feed of wire 20.

Figure 3:
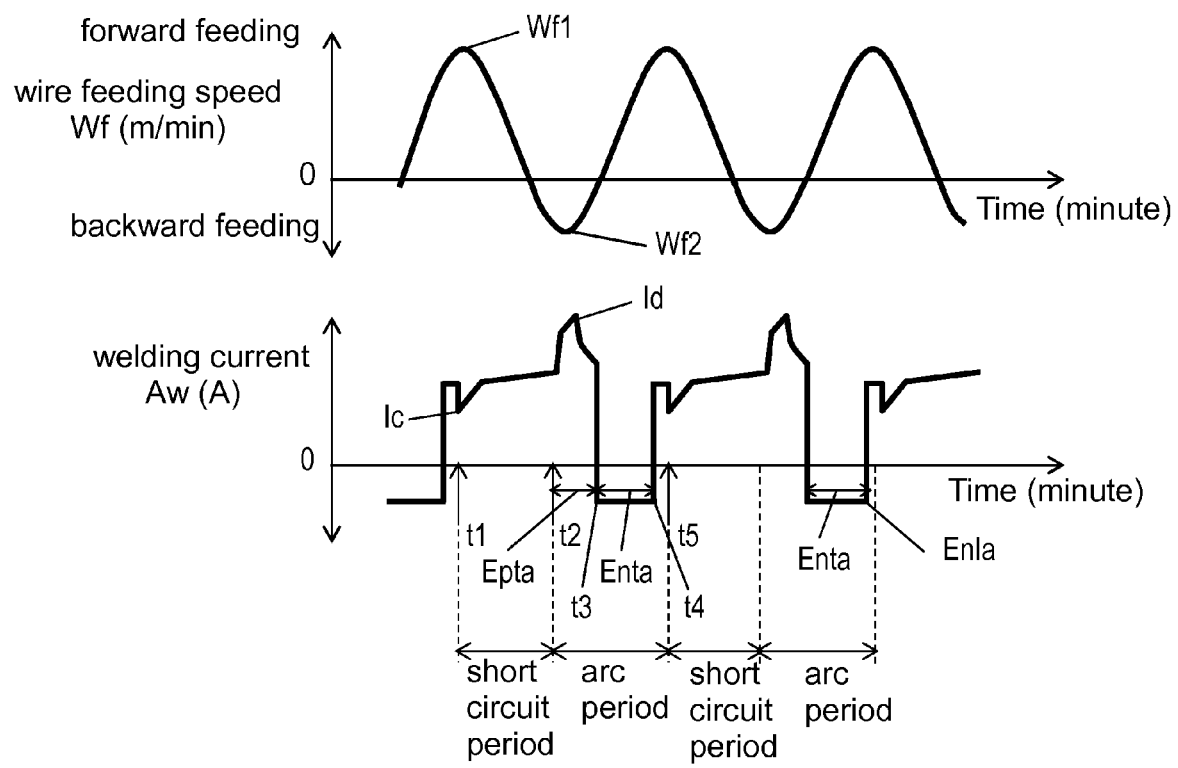
FIG. 3 is a chart showing an output waveform of an arc welding control method according to the third and fourth exemplary embodiments of the present invention.
Figure 4:
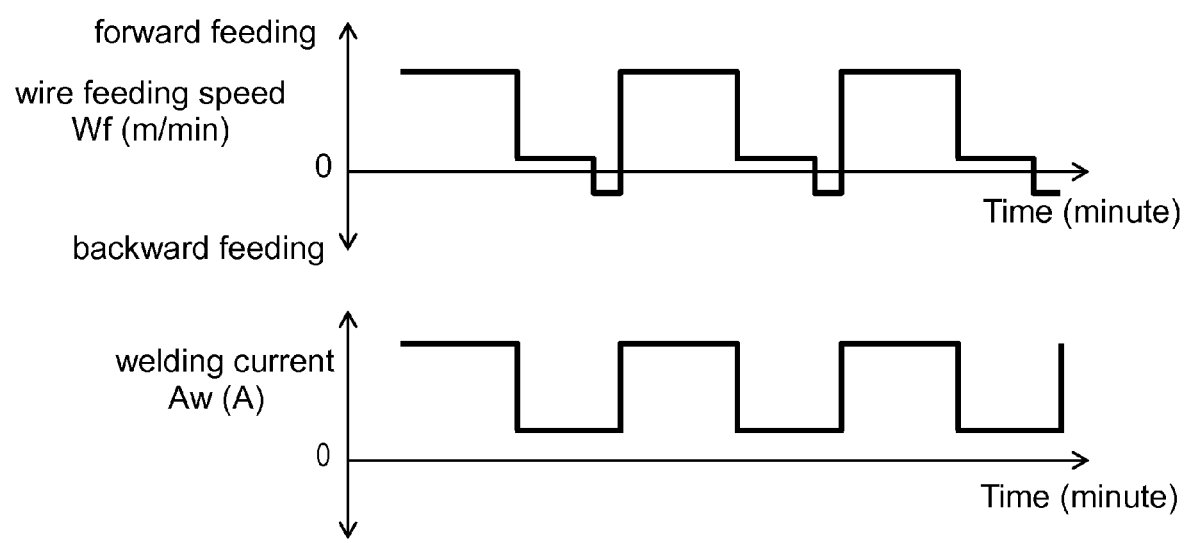
FIG. 4 is a chart showing an output waveform of a conventional arc welding control method which is accompanied by a short circuit.

FIG. 3 is a chart showing an output waveform of an arc welding control method according to the third exemplary embodiment of the present invention, illustrating temporal waveforms for wire feeding speed Wf and welding current Aw in the case in which welding is carried out by an arc welding control method of a consumable electrode type. The feed of wire 20 is controlled to repeat the forward feeding and the backward feeding as shown in wire feeding speed Wf of FIG. 3.

In the case in which wire feeding speed Wf indicates the forward feeding, that is, wire 20 is fed in a direction of base metal 22, there is a tendency that a short circuit is apt to be caused in the vicinity of wire feeding speed Wf1 having a high forward feeding speed. In the case in which wire feeding speed Wf is the backward feeding, that is, wire 20 is fed in such a direction as to separate from base metal 22, there is a tendency that the short circuit is opened and an arc is apt to be generated in the vicinity of wire feeding speed Wf2 having a high backward feeding speed. By the execution of the cyclic feed of wire 20, a short circuit state in which wire 20 and base metal 22 come in contact with each other to cause the short circuit and an arc state in which the arc is generated are cyclically repeated as shown in FIG. 3.

As shown in FIG. 3, welding current Aw is properly controlled corresponding to a short circuit period from time t1 to time t2 for the short circuit period. For an arc period from time t2 to time t5, welding current Aw is controlled to form a droplet having a proper size in order to smoothly transfer, to base metal 22, a droplet formed on a tip of wire 20 for a short circuit period generated subsequently.

Since an arc welding apparatus according to the third exemplary embodiment is constituted by the same components as those in arc welding apparatus 1 of a consumable electrode type shown in FIG. 1, it will be described with reference to FIG. 1. Referring to wire feeding control, wire feeding speed control unit 16 outputs, to wire feeding unit 19, a signal for cyclically controlling the feed of wire 20 into forward feeding and backward feeding through a predetermined cycle and a predetermined amplitude. Wire feeding unit 19 controls the feed of wire 20 based on the signal sent from wire feeding speed control unit 16.

The cyclic wire feeding control may be carried out in a shape of a sine wave shown in FIG. 3, a shape of a trapezoidal wave, or cyclic shapes of other waveforms.

Moreover, wire feeding speed control unit 16 includes storage unit 17 and wire feeding speed determining unit 18, and serves to output a signal to wire feeding unit 19, thereby controlling the wire feed. Storage unit 17 stores a welding set current, an average feeding speed of a wire feeding speed, a frequency of the wire feeding speed and an amplitude of the wire feeding speed, and stores an expression or a table which causes them to correspond to each other. Wire feeding speed determining unit 18 determines the average feeding speed of the wire feeding speed, and frequencies and amplitudes of the forward feeding and the backward feeding from storage unit 17 based on the expression or table which is stored in storage unit 17 and the welding set current which is set by welding condition setting unit 15.

As described above, according to the arc welding control method and the arc welding apparatus in accordance with the third exemplary embodiment, each of the generation of the short circuit and the opening of the short circuit are once carried out so that a short circuit cycle is stabilized depending on a cyclic operation of the wire feeding speed in a cycle of one time forward and backward feeding at wire feeding speed Wf. By the stabilization of the short circuit cycle, fluctuation in the arc period is also reduced as compared with the case in which wire feeding speed Wf shown in FIG. 2 is constant. Therefore, it is possible to set second predetermined time Enta to be long.

By executing the cyclic wire feed including the forward feeding and the backward feeding, moreover, it is possible to prolong a short circuit duration in one cycle as will be described below. Therefore, a welding voltage can be dropped so that an energy input amount to base metal 22 can be reduced. For example, a rate of the short circuit duration in one cycle is approximately 10% to 30% in the case in which wire feeding speed Wf is constant, and is approximately 30% to 50% in the case in which the forward feeding and the backward feeding are repeated cyclically. Consequently, it is possible to further reduce the energy input amount to base metal 22 with respect to welding in which wire feeding speed Wf is constant. Consequently, it is possible to easily take a countermeasure against welding of a thin plate, a gap between base metals 22 or the like on a welding spot without causing burn-through or the like.

First predetermined time Epta and second predetermined time Enta may be determined based on the wire feeding speed to be cyclically changed in a predetermined cycle and a predetermined amplitude.

Moreover, the arc welding control method according to the third exemplary embodiment may be set to be a method of carrying out welding at a wire feeding speed to change cyclically, in a predetermined cycle and a predetermined amplitude, welding wire feed into forward feeding to be performed in a direction of a welding target and backward feeding to be performed in a reverse direction to the forward feeding.

By the method, it is possible to prolong the short circuit duration. Therefore, it is possible to drop the welding voltage, and furthermore, to reduce the energy input amount to the base metal.

In addition, it is also possible to employ a method of determining the first predetermined time based on the wire feeding speed to carry out the cyclic change in the predetermined cycle and the predetermined amplitude.

By the method, it is possible to prolong the short circuit duration. Therefore, it is possible to drop the welding voltage, and furthermore, to reduce the energy input amount to the base metal.

Moreover, the arc welding apparatus according to the third exemplary embodiment may have a structure in which welding is carried out at a wire feeding speed to change cyclically, in a predetermined cycle and a predetermined amplitude, the welding wire feed into forward feeding to be performed in a direction of a welding target and backward feeding to be performed in a reverse direction to the forward feeding.

By the structure, it is possible to prolong the short circuit duration. Therefore, it is possible to drop the welding voltage, and furthermore, to reduce the energy input amount to the base metal.

In addition, it is also possible to employ a structure in which the first predetermined time is determined based on the wire feeding speed to carry out the cyclic change in the predetermined cycle and the predetermined amplitude.

By the structure, it is possible to prolong the short circuit duration. Therefore, it is possible to drop the welding voltage, and furthermore, to reduce the energy input amount to the base metal.

Moreover, the arc welding apparatus according to the third exemplary embodiment may have a structure in which a welding condition setting unit to set a welding condition is provided, the polarity inversion setting unit stores at least either the first predetermined times or the second predetermined times which are caused to correspond to the welding set current set by the welding condition setting unit, and the polarity inversion setting unit determines the first predetermined time and the second predetermined time based on the welding set current set by the welding condition setting unit.

By the structure, it is possible to prolong the short circuit duration. Therefore, it is possible to drop the welding voltage, and furthermore, to reduce the energy input amount to the base metal. Thus, it is possible to easily take a countermeasure against the welding of a thin plate, a gap between base metals or the like on a welding spot without causing burn-through or the like.

(Fourth Exemplary Embodiment)

A fourth exemplary embodiment according to the present invention is mainly different from the first exemplary embodiment or the third exemplary embodiment in that first predetermined time Epta or second predetermined time Enta can be adjusted depending on an adjusting amount of first predetermined time Epta or that of second predetermined time Enta which is set by using a time adjusting amount setting unit (not shown) provided in welding condition setting unit 15. First predetermined time Epta and second predetermined time Enta are prestored in polarity inversion setting unit 12 and are determined based on a welding set current which is set by welding condition setting unit 15.

Since an arc welding apparatus according to the fourth exemplary embodiment is constituted by the same components as those in arc welding apparatus 1 of a consumable electrode type shown in FIG. 1, it will be described with reference to FIG. 1. Polarity inversion setting unit 12 shown in FIG. 1 stores first predetermined time Epta and second predetermined time Enta corresponding to a welding set current value which is set by welding condition setting unit 15. An operator sets the adjusting amounts of first predetermined time Epta and second predetermined time Enta by the time adjusting amount setting unit of welding condition setting unit 15. Consequently, polarity inversion setting unit 12 can adjust a corresponding value to the welding set current value depending on the adjusting amounts which are set, and can thus change first predetermined time Epta and second predetermined time Enta. For example, it is preferable to adjust first predetermined time Epta to be short and second predetermined time Enta to be long in the case in which an energy input amount to base metal 22 is decreased to lessen a weld penetration amount.

In other words, the welding condition setting unit of the arc welding apparatus according to the fourth exemplary embodiment may have a structure including an adjusting amount setting unit to output, to the polarity inversion setting unit, the adjusting amounts to adjust the first predetermined time and the second predetermined time which are determined by the polarity inversion setting unit based on the welding set current set by the welding condition setting unit.

By the structure, the values of first predetermined time Epta and second predetermined time Enta are caused to correspond to the welding set current value and the corresponding values are adjusted, thereby enabling the change of first predetermined time Epta and second predetermined time Enta. Consequently, it is possible to adjust an energy input amount to a base metal, and furthermore, to adjust the energy input amount depending on a thickness of the base metal. Accordingly, it is possible to easily take a countermeasure against welding of a thin plate, a gap between the base metals or the like on a welding spot without causing burn-through or the like.

INDUSTRIAL APPLICABILITY

According to the present invention, an energy input amount to a base metal can be reduced. Consequently, it is possible to weld a thin plate (having a thickness of 0.6 mm or less, for example) without causing burn-through, for example, which is hard to perform by a conventional arc welding control method. Thus, the present invention is industrially useful as an arc welding apparatus or arc welding control method of a consumable electrode type, or the like which carries out arc welding while continuously feeding a welding wire to be a consumable electrode to the thin plate.

REFERENCE MARKS IN THE DRAWINGS 1 arc welding apparatus
1a output terminal 2 input power supply
3 primary side rectifying unit
4 switching unit
5 main transformer
6 secondary side rectifying unit
7 reactor
8 welding current detecting unit
9 welding voltage detecting unit
10 short circuit/arc detecting unit
11 output control unit
12 polarity inversion setting unit
13 polarity inversion output control unit
14 polarity inversion switching unit
15 welding condition setting unit
16 wire feeding speed control unit
17 storage unit
18 wire feeding speed determining unit
19 wire feeding unit
20 wire
21 arc
22 base metal
23 torch
24 tip

The invention claimed is:

1. An arc welding control method of repeating a short circuit and an arc to perform welding, comprising:
controlling a welding current to conduct a welding current having a first polarity during a short circuit period;
carrying out a first commutation to commutate the welding current from the first polarity to a second polarity to be opposite to the first polarity during an arc period subsequent to the short circuit period; and
controlling the welding current to carry out a second commutation to commutate the welding current from the second polarity to the first polarity during the arc period in which the first commutation is executed,
wherein an entirety of the first commutation and an entirety of the second commutation both occur in the arc period.

2. The arc welding control method according to claim 1, wherein the first commutation is carried out after a first predetermined time passes since a start of the arc period.

3. The arc welding control method according to claim 1, wherein the second commutation is carried out after a second predetermined time passes since the execution of the first commutation.

4. The arc welding control method according to claim 1, wherein a welding wire is fed at a wire feed speed by alternating forward feeding and backward feeding cyclically, in a predetermined cycle and a predetermined amplitude.

5. The arc welding control method according to claim 4, wherein
the first commutation is carried out after a first predetermined time passes since a start of the arc period, and
the first predetermined time is determined based on the wire feeding speed.

6. An arc welding apparatus to repeat a short circuit and an arc to perform welding between a welding wire and a welding target, comprising:
a primary side rectifying unit to rectify an input AC power;
a switching unit to set an output of the primary side rectifying unit into an alternating current;
a transformer to transform an output of the switching unit;
a secondary side rectifying unit to rectify an output of the transformer;
a polarity change-over unit to change over an output of the secondary side rectifying unit into an output having a first polarity or a secondary polarity to be opposite to the first polarity;
a welding voltage detecting unit to detect a welding output voltage;
a short-circuit arc deciding unit to decide a short circuit period or an arc period based on a result of the detection obtained by the welding voltage detecting unit; and
a polarity inversion setting unit to output a polarity inversion control signal to the polarity change-over unit based on a result of the decision obtained by the short-circuit arc deciding unit,
wherein the polarity inversion setting unit outputs a polarity inversion control signal to the polarity change-over unit to conduct a welding current having the first polarity, thereby outputting the welding current having the first polarity during the short circuit period,
the polarity inversion setting unit outputs a polarity inversion control signal to the polarity change-over unit to carry out a first commutation to commutate the welding current from the first polarity to a second polarity to be opposite to the first polarity, thereby outputting the welding current having the second polarity during an arc period subsequent to the short circuit period, and
the polarity inversion setting unit outputs a polarity inversion control signal to the polarity change-over unit to carry out a second commutation to commutate the welding current from the second polarity to the first polarity, thereby outputting the welding current having the first polarity during the arc period in which the first commutation is executed,
wherein an entirety of the first commutation and an entirety of the second commutation both occur in the arc period.

7. The arc welding apparatus according to claim 6, wherein the polarity inversion setting unit times an elapsed time since a start of the arc period and outputs the polarity inversion control signal to carry out the first commutation after a first predetermined time passes since the start of the arc period.

8. The arc welding apparatus according to claim 6, wherein the polarity inversion setting unit times an elapsed time since the execution of the first commutation and outputs the polarity inversion control signal to carry out the second commutation after a second predetermined time passes since the execution of the first commutation.

9. The arc welding apparatus according to claim 6, further comprising a wire feeding control unit to control feed of the welding wire,
wherein the welding wire is fed at a wire feed speed by alternating forward feeding and backward feeding cyclically, in a predetermined cycle and a predetermined amplitude.

10. The arc welding apparatus according to claim 9, wherein
the first commutation is carried out after a first predetermined time passes since a start of the arc period, and
the first predetermined time is determined based on the wire feeding speed.

11. The arc welding apparatus according to claim 6, further comprising a welding condition setting unit to set a welding condition,
wherein the polarity inversion setting unit stores at least one of the first predetermined time and the second predetermined time which correspond to a welding set current set by the welding condition setting unit, and the polarity inversion setting unit determines the first predetermined time and the second predetermined time based on the welding set current.

12. The arc welding apparatus according to claim 11, wherein the welding condition setting unit has an adjusting amount setting unit, and the adjusting amount setting unit outputs, to the polarity inversion setting unit, adjusting amounts for adjusting the first predetermined time and the second predetermined time.

13. The arc welding control method according to claim 2, wherein a welding wire is fed at a wire feed speed by alternating forward feeding and backward feeding cyclically, in a predetermined cycle and a predetermined amplitude.

14. The arc welding control method according to claim 3, wherein a welding wire is fed at a wire feed speed by alternating forward feeding and backward feeding cyclically, in a predetermined cycle and a predetermined amplitude.

15. The arc welding apparatus according to claim 7, further comprising a wire feeding control unit to control feed of the welding wire,
wherein the welding wire is fed at a wire feed speed by alternating forward feeding and backward feeding cyclically, in a predetermined cycle and a predetermined amplitude.

16. The arc welding apparatus according to claim 8, further comprising a wire feeding control unit to control feed of the welding wire,
wherein the welding wire is fed at a wire feed speed by alternating forward feeding and backward feeding cyclically, in a predetermined cycle and a predetermined amplitude.

17. An arc welding method comprising:
a short circuit welding for welding with a welding current having a first polarity during a short circuit period; and
an arc welding for welding with an arc during an arc period subsequent to the short circuit period,
wherein a welding current at a start of the arc period has the first polarity,
a welding current at an end of the arc period has the first polarity, and
a welding current in a middle of the arc period has a second polarity opposite to the first polarity.

18. The arc welding method according to claim 17, wherein the welding current at the start of the arc period is changed to the welding current in the middle of the arc period after a first predetermined time passes since the start of the arc period.

19. The arc welding method according to claim 17, wherein a welding wire is fed at a wire feed speed by alternating forward feeding and backward feeding cyclically in a predetermined cycle and a predetermined amplitude.

20. The arc welding method according to claim 19, wherein
the welding current at the start of the arc period is changed to the welding current in the middle of the arc period after a first predetermined time passes since the start of the arc period, and
the first predetermined time is determined based on the wire feeding speed.

* * * * *